United States Patent

Church

(10) Patent No.: US 6,722,706 B2
(45) Date of Patent: Apr. 20, 2004

(54) THREAD FROM WITH MULTIFACITED FLANKS

(75) Inventor: Kris L. Church, Montgomery, TX (US)

(73) Assignee: John Gandy Corporation, Conroe, TX (US)

( * ) Notice: Subject to any disclaimer, the term of this patent is extended or adjusted under 35 U.S.C. 154(b) by 0 days.

(21) Appl. No.: 09/817,569

(22) Filed: Mar. 26, 2001

(65) Prior Publication Data

US 2003/0067169 A1 Apr. 10, 2003

Related U.S. Application Data

(62) Division of application No. 09/298,081, filed on Apr. 23, 1999, now Pat. No. 6,254,146.

(51) Int. Cl.[7] ............................ F16L 25/00; F16L 35/00
(52) U.S. Cl. .................. 285/334; 285/333; 285/355; 285/390
(58) Field of Search ................................ 285/333, 334, 285/355, 390

(56) References Cited

U.S. PATENT DOCUMENTS

| 4,730,857 A | * | 3/1988 | Schwind | 285/390 |
|---|---|---|---|---|
| 4,917,409 A | * | 4/1990 | Reeves | 285/334 |
| 5,338,074 A | * | 8/1994 | Barringer et al. | 285/334 |
| 5,360,240 A | * | 11/1994 | Mott | 285/95 |
| 5,492,375 A | * | 2/1996 | Smith | 285/334 |
| 6,009,611 A | * | 1/2000 | Adams et al. | 29/407.01 |
| 6,158,785 A | * | 12/2000 | Beaulier et al. | 285/334 |
| 6,206,436 B1 | * | 3/2001 | Mallis | 285/334 |
| 6,322,110 B1 | * | 11/2001 | Banker et al. | 285/334 |

FOREIGN PATENT DOCUMENTS

| BE | 547584 | * | 11/1959 | 285/333 |
|---|---|---|---|---|
| CA | 538797 | * | 3/1957 | 285/333 |
| DE | 827935 | * | 1/1952 | 285/334 |
| DE | 3927436 | * | 10/1990 | 285/334 |
| GB | 846748 | * | 8/1960 | 285/333 |

* cited by examiner

Primary Examiner—Lynne H. Browne
Assistant Examiner—Aaron Dunwoody
(74) Attorney, Agent, or Firm—Charles D. Gunter, Jr.

(57) ABSTRACT

A thread form for a tubular connection of the type having a pin member adapted to be made-up with a box member to form a pipe joint as shown. The pin member has pin threads with thread crests and thread roots which are adapted to be made-up with a mating box member having a complimentary thread structure. The pin thread crests are formed between a stab flank and a load flank of the pin thread. The pin thread has a multi-facited complex profile stab flank for engaging a mating stab flank on the complimentary box member to provide a wedging interfit between the surfaces of the pin and box threads. The pin and box threads are also helically structured as a wedge.

2 Claims, 5 Drawing Sheets

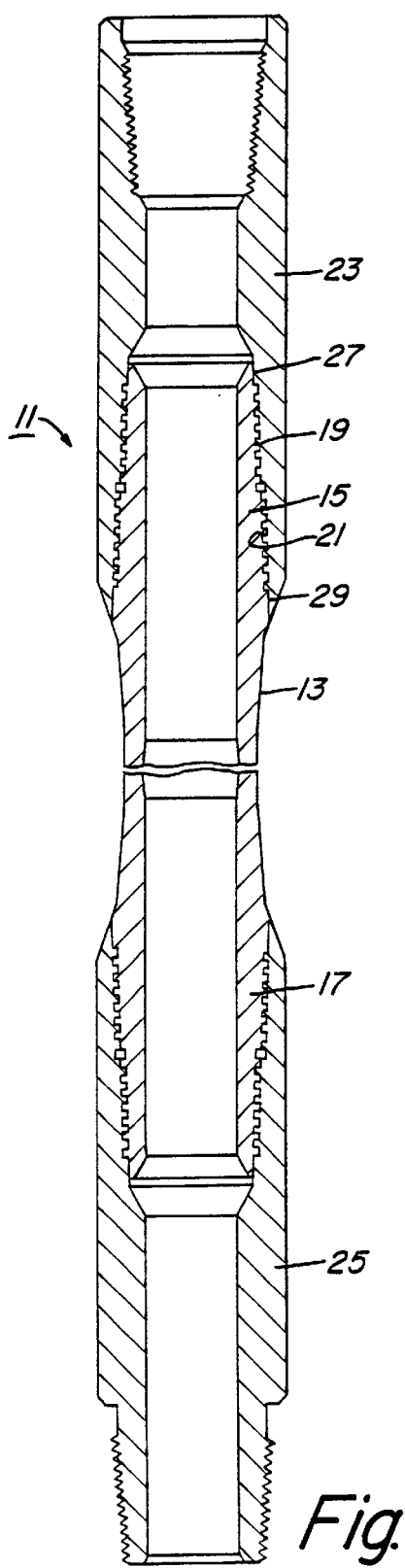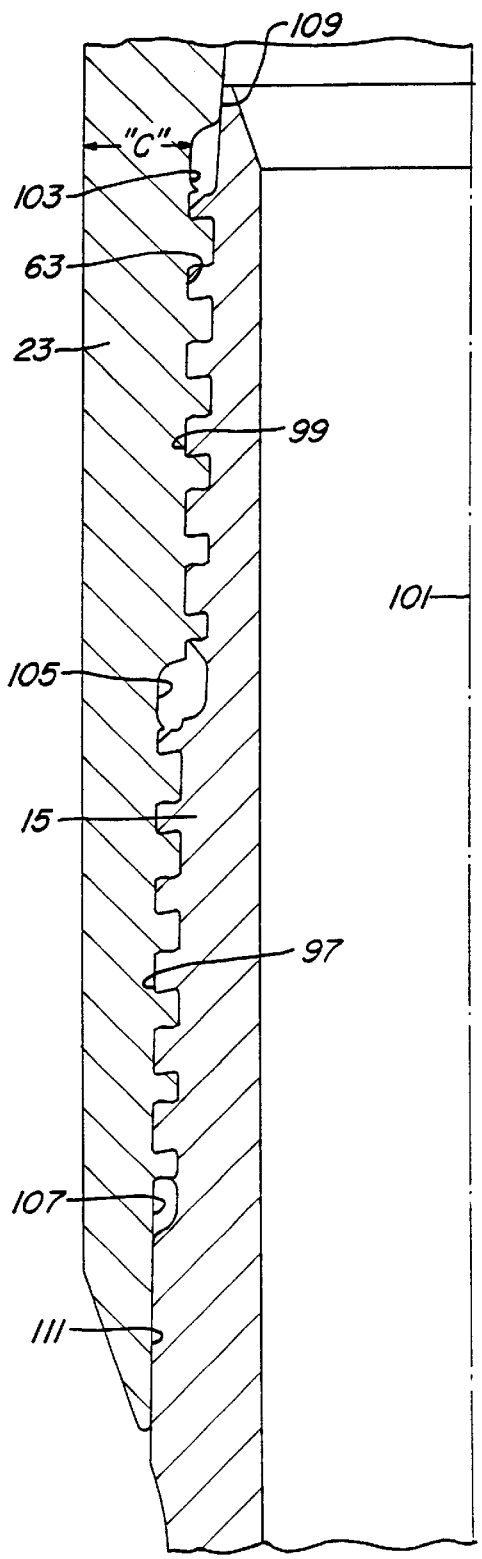

THREAD FROM WITH MULTIFACITED FLANKS

Cross Reference To Related Applications:

The present application is a divisional of pending U.S. Ser. No. 09/298,081, filed Apr. 23, 1999, entitled Thread Form With Multifacited Flanks.

BACKGROUND OF THE INVENTION

1. Field of the Invention

The present invention relates generally to a thread form for tubular connections, and, more specifically, to threaded connections of the type used for securing flow conduits to form a desired continuous flow path.

2. Description of the Prior Art

A variety of threaded connections are known in the prior art for joining flow conduits in an end-to-end relationship to form a continuous flow path for transporting fluid. For example, such threaded connections are used in pipe strings employed for the production of hydrocarbons and other forms of energy from subsurface earth formations. Examples of such pipe strings include drill pipe, well casing and production tubing, known commonly as "oil field tubular goods." Other applications for the threaded connections of the invention include horizontal/trenchless drilling operations. These are non-oilfield applications associated with the construction industry. All of these type goods employ threaded connections of the type under consideration for connecting adjacent conduit sections or pipe joints.

There have been numerous advances in thread technology in recent years. U.S. Pat. No. Re. 30,647 issued to Blose in 1981 disclosed a tubular connection having a unique thread form which provided an unusually strong connection while controlling the stress and strain in the connected pin and box members of the connection. The thread form featured mating helical threads which were tapered in thread width in opposite directions to provide wedge-like engagement of the opposing flanks to limit rotational make-up of the connection.

The wedge thread, if properly designed, provides high torsional resistance without inducing axial or radial stresses into the tubular connection upon make-up of the joint. Tubular connections with high torsional resistance resist additional make-up in the joint when in service, making it easier to break out the joints if this becomes necessary. By reducing axial or radial stresses in the threaded connection, a sounder connection is provided which is able to withstand a greater level of operating stress and strain. Whereas, traditional threaded connections employed mating threads structures which placed in the pin in hoop compression and the box in hoop tension, the Blose connection controlled the stresses induced in the mating members to pull the two members together, rather than apart.

U.S. Pat. No. 4,600,224, issued Jul. 15, 1986 to Blose was a refinement and further improvement to the basic wedge thread concept. In the invention disclosed in the '224 patent, a connection was shown having a "chevron" load flank. Radial make-up of the threaded connection was controlled by the special thread structuring where the radial movement of a thread into a mating thread groove was restricted by a chevron type interfit between two load bearing thread surfaces of the threaded connection instead of relying upon thread width alone.

Due to the helical wedging action of the threads and the balance of radial components from the forces on the stab and load bearing surfaces of the threads, no radial component of stress was induced in either the pin or box member of the connection. It was also possible to control axial make-up of the threaded connection without abutting a shoulder on the joint through the wedging action of the threads themselves. By controlling the radial interfit between mating threads, lubricant entrapment could be controlled.

U.S. Pat. No. Re. 34,467 issued Dec. 7, 1992 to Reeves purported to be an improvement to the basic Blose wedge thread design. As explained by the patentee, when Blose's connection is rotatably made up to engage both the front and back thread load flanks, incompressible thread lubricant or other liquid may be trapped between the engaged load flanks. This trapped thread lubricant can resist the make-up torque and give a false torque indication that results in lower than desired stress and strain being induced in the Blose connection and reducing the design strength and load carrying capacity. The invention described in U.S. Pat. No. Re. 34,467 purports to preclude the possibility of false indication of torque by excluding thread lubricant from between the thread load flanks that are brought into engagement at make-up.

In the conventional prior art connection, only a single load flank is typically engaged during make-up and clearance is provided adjacent the back thread flank. By providing thread clearance on the back flank of conventional thread structures, a helical escape flow passage or reservoir is provided for receiving any excess of displaced liquid thread lubricant during make-up. Since Blose's threads were structured helically as a "wedge", it was necessary to provide a radial clearance between the thread crests and roots upon make-up to provide the desired escape path or any entrapped lubricant. U.S. Pat. No. Re. 34,467 purports to eliminate the problem of entrapped lubricant by optimizing the geometry of the Blose wedge thread structure.

As stated by the patentee, the root wall on the external thread member contacts the crest walls on the internal thread member to exclude the trapping of liquid therebetween during rotational make-up of the connection. In the earlier Blose connection, the roots and crests of the threads did not engage. Thread lubricant could be trapped in the long helical space between the roots and crests of the thread. In U.S. Pat. No. Re. 34,467, the threads were modified so that the roots and crests would engage before the load flanks engaged, thereby causing the thread lubricant between the roots and crests to be squeezed out from between the surfaces before the connection is fully made up.

In U.S. Pat. No. Re. 30,647 and U.S. Pat. No. Re. 34,467, the preferred threads were "dovetailed-shaped" in cross section, being wider at the crests than at the roots. U.S. Pat. No. 4,600,224 was a departure from the Blose design in that a semi-dovetail or partial dovetail thread was disclosed. However, the thread crest width continued to be greater than the thread root width as in the traditional definition of the term "dovetail."

The present invention has as its object to provide a further modification of the basic wedge thread concept which provides improved performance over the prior art designs.

SUMMARY OF THE INVENTION

The improved thread form of the invention controls radial make-up by special thread structuring where the radial movement of a thread into a mating thread groove is controlled by a complex profile interfit between the two mating thread surfaces of the threaded connection. The complex profile can be present on the stab flank, on the load flank, or on a combination of the two flanks. A controlled clearance is provided between the mating crests of the interengaged threads to prevent hydraulic pressure buildup caused by entrapped lubricant between the thread crests and roots. The stab flanks complex profile can be a chevron-shaped double sloped flank which is adapted to engage a mating flank of the complimentary box member. Preferably, the complex profile provided on the stab and/or load flanks of the thread form is a multi-faceted flank having at least three facits and four radii per stab flank. The pin thread crests have a crest width and the pin roots have a root width. The width of the crest is less than the width of the roots, which is exactly opposite that of the general dovetail design.

The thread form of the invention is intended for use in a tubular connection of the type having a box with internal threads with stab flanks and load flanks and flat roots and crests and a pin having external threads with stab flanks and load flanks and flat crests and roots for mating with the internal threads of the box to make up a pipe connection. The threads increase in width in one direction on the box and in the other direction on the pin so that the roots, crests, and flanks of the threads move together during make-up.

The pin thread has a complex profile stab flank made up of at least an inner wall portion and an intersecting outer wall portion which together form a double sloped flank for engaging a mating stab flank of the complimentary box member to provide an interfit between the stab flanks of the pin and box members. The interfit serves to limit radial movement of the pin threads into the mating box member complimentary thread structure to control radial make-up of the pipe connection. Preferably, the complex profile stab flank is a multi-faceted flank having at least three facits and four radii per stab flank. In a particularly preferred embodiment, the pin thread also has a complex profile load flank for engaging a mating load flank of the complimentary box member. The interfit of the pin and box stab flanks and load flanks provides a clearance between the roots and crest of the pin and box threads to allow venting of any entrapped thread lubricant.

A threaded tool joint adapter connection having encapsulated stresses is also shown. The adapter connection features an intermediate member with oppositely facing pin ends. The oppositely facing pin ends engage mating box members which can be used to attach a standard, rotary tool joint connection to upset pipe. In one embodiment, the intermediate member is formed of a corrosion resistant alloy. The box members are formed of NACE approved materials. The pin and box threads can have the previously described complex stab and load flanks to provide the desired interfit between the flanks of the pin and box members or can have other wedge thread profiles. A metal-to-metal seal is formed between mating surfaces of the box and pin and opposite extents of the threaded surfaces thereof at either end of the connection. The metal-to-metal seals serve to encapsulate the threaded surfaces of the connection and thereby isolate the encapsulated surfaces from corrosive attack.

Additional objects, features and advantages will be apparent in the written description which follows.

BRIEF DESCRIPTION OF THE DRAWINGS

FIG. 1 is a side, cross-sectional view of a threaded tool joint adapter connection employing the improved thread form of the invention.

FIG. 2 is a side, cross-sectional view of a portion of the tapered connection used in the adapter of FIG. 1 showing the thread form of the invention.

DETAILED DESCRIPTION OF THE INVENTION

Figure 3:
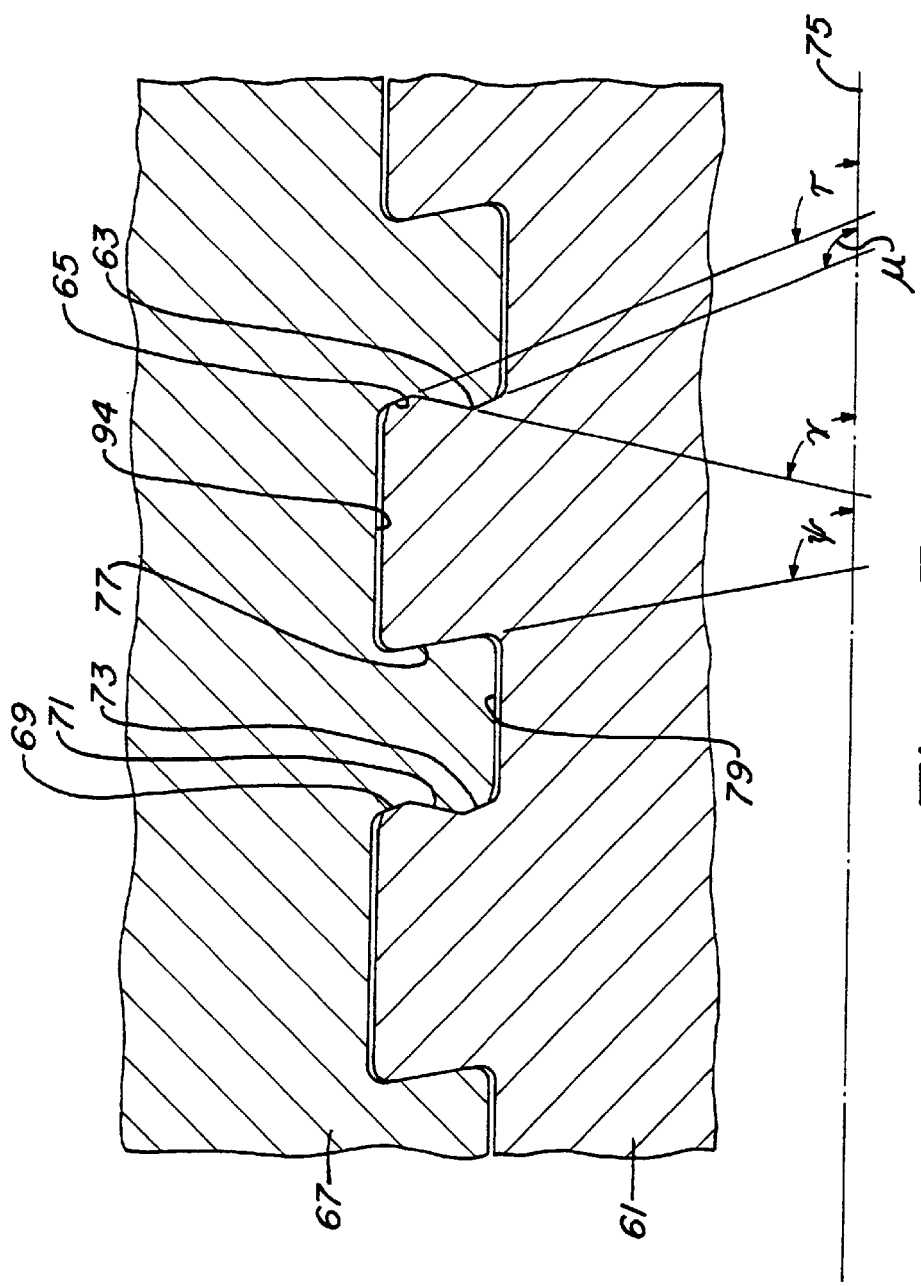
FIG. 3 is an isolated, close-up view of the thread form of the invention in the fully made-up position the stab flanks of the pin member being provided with a complex profile.

FIG. 1 shows a threaded tool joint adapter connection, designated generally as 11 employing the improved thread form of the invention. The adapter 11 includes an intermediate member 13 having oppositely facing pin ends 15, 17, each of which has external threads 19 which are adapted to mate with mating internal threads 21 of the mating box end members 23, 25.

In a particularly preferred form of the invention, the intermediate member 13 is formed of a corrosion resistant alloy (CRA) material while the end members 23, 25 are formed of drill pipe meeting NACE standards. Typical examples of CRA type materials include: (1) stainless steel; conventional austenitic, high alloy austenitic, martensitic, precipitation hardened, duplex and ferritic; (2) precipitation hardened and solid solution nickel-base alloys; nickel copper alloys; and (3) cobalt-base, titanium and zirconium alloys. This description of the general classification of CRA materials actually includes a myriad of material options, depending upon the well application under consideration, and is merely intended to be illustrative of suitable materials for use in practicing the invention.

In addition to having the mating wedge-type threads of the invention 19, 21, the connection employs metal-to-metal seals 27, 29 at the external and internal terminus of the threaded regions. This configuration insures that all stresses that would make the base material subject to corrosive attack, i.e., in the threaded area, will be encapsulated and isolated from corrosive media, whether internal or external. Additionally, the metal-to-metal seals protect the internal critical section area of the joint from corrosive fluids. This area of highest stress would typically be the point of failure in rotary service, but the fact that it is protected and even structurally supported by the metal-to-metal seal area tends to throw the point of failure beyond the connection boundaries.

As will be explained in greater detail, the connection does not employ a positive torque stop. The wedge thread form of the invention takes up the applied torque and provides a semi-positive torque stop. Because the wedge threads lock the pin and box members together, high radial stresses are not required to hold the connection together. By eliminating a positive torque stop, the need for a torque shoulder is eliminated. This, in turn, eliminates the need for the material required to machine such a shoulder. As a result, the connection of the invention can be placed on pipes having a smaller OD, larger ID, or some combination thereof, than would be the case with shouldered connections having a similar torque capacity. One preferred application of the thread form of the invention is to a smaller diameter (2⅜ inch) tool joint used in shallow, horizontal drilling for the trenchless drilling industry. The same connection can be used in the mining industry. The connection is well suited for applying to short lengths of drill pipe used in a horizontal boring machine which is commonly employed for drilling holes and pulling pipe or cable under roads, streams, and other surface barriers.

Although only the tool joint threaded connection of FIG. 1 embodying the thread form of the invention is shown, it will be understood that other types of connections can be made using the thread form of the invention. For example, the connections can be upset or non-upset and can be tapered or "cylindrical", non-tapered connections. Connections can also employ other types of wedge threads such as those described in Blose U.S. Pat. No. Re. 30,647 and Reeves U.S. Pat. No. Re. 34,467.

Figure 5:
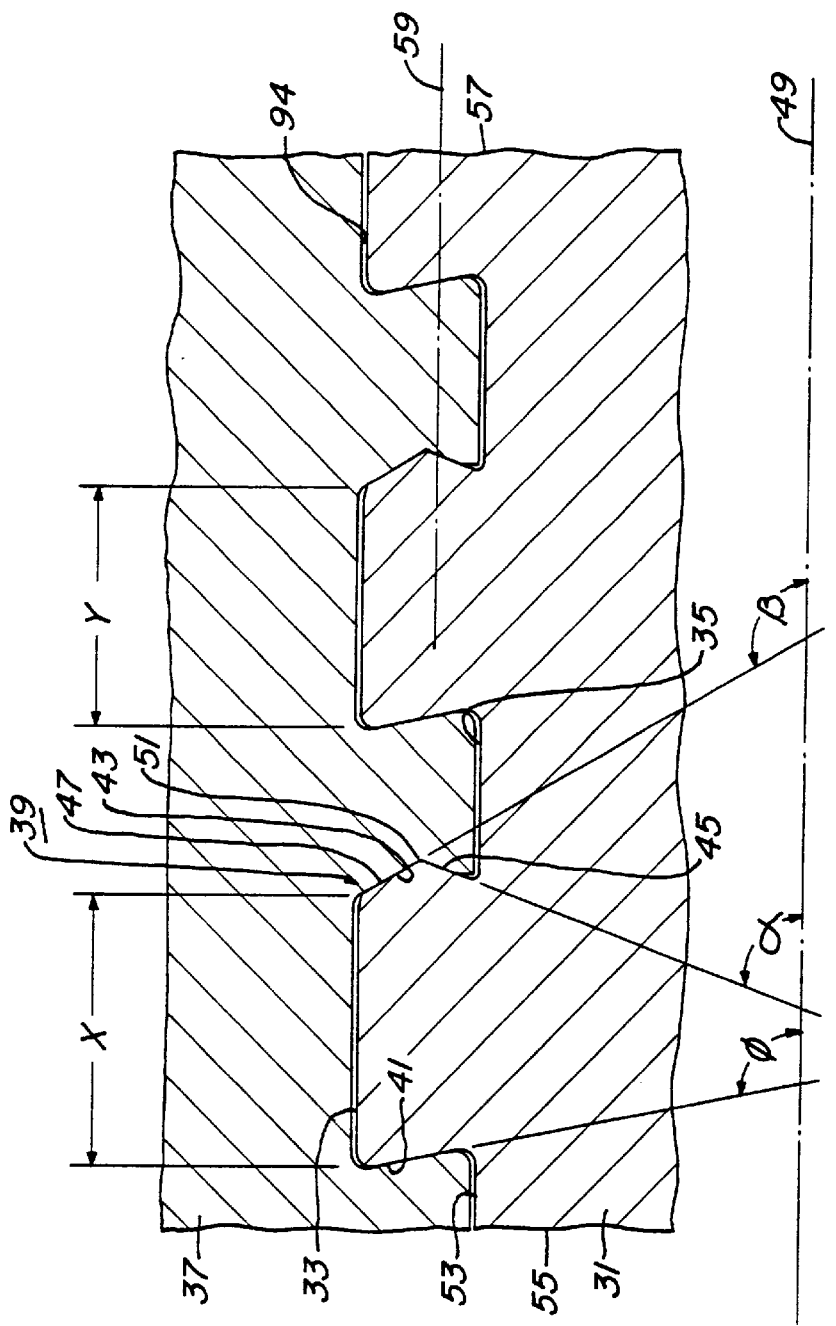
FIG. 5 is an isolated, close-up view, similar to FIGS. 3 and 4 showing a chevron profile on the stab flank of the pin member.

FIG. 5 shows one thread form of the invention in greater detail. As shown in FIG. 5, the pin member 31 has pin threads with thread crests 33 and thread roots 35. The crests 33 and roots 35 of the pin member 31 are adapted to be made up with a mating box member 37 having a complimentary thread structure. The pin thread crests 33 are formed between a stab flank 39 and a load flank 41 of the pin thread.

As used herein, the term "load flank" will be understood to designate that sidewall of a thread that faces away from the outer end from the respective male or female member on which the thread is formed, and the term "stab flank" will be understood to refer to that sidewall surface that faces toward the outer end of the respective male or female member and supports the weight of the joint during the initial make-up of the joint.

The pin thread stab flank 39 is a double-sloping chevron-shaped flank which is adapted for engaging a mating flank 43 of the complimentary box member 37 to provide a chevron type interfit between the stab flanks of the pin and box threads. As shown in FIG. 5, the pin thread chevron-shaped stab flank 39 is made up of an inner wall portion 45 and an intersecting outer wall portion 47. The inner wall portion 45 forms a negative angle α with respect to the longitudinal axis 49 of the tubular connection. By "negative" angle is meant that the angle α formed between the inner wall portion 45 and the adjacent thread root 35 is an acute angle whereby the inner wall portion 45 flares inwardly toward the thread root 35. As shown in FIG. 5, the outer wall portion 47 of the pin stab flank forms a positive or obtuse angle β with respect to the longitudinal axis 49, whereby the outer wall portion 47 flares outwardly from the point of intersection 51 with the inner wall portion 45 of the thread flank.

The pin load flank 41 forms a positive angle theta with respect to the longitudinal axis 49 and the load flank 41 flares inwardly with respect to the adjacent pin thread root 53. Load flank 41 and the inner wall portion 45 are thus non-parallel. The thread crests 33 and roots 35 can be parallel to the longitudinal axis 49 of the tubular connection but may also be parallel or non-parallel to a taper of the connection.

Both the pin and box threads are helical wedge threads and thus have progressively changing axial width along the helical length thereof. In other words, viewing the pin member in FIG. 5, it can be seen that the thread width of each successive thread progressively decreases from the outer extent 55 of the pin member along the helical length thereof to the inner extent 57 adjacent the mouth of the pin member. Thus, the thread width of the pin member 31 at "X" is greater than the thread width "Y" in FIG. 5. The axial thread width of the box member 37 progressively decreases in the opposite direction. The progressively changing axial width of the pin and box threads provides a wedging interfit to limit axial make-up of the tubular connection.

The threaded tubular connection can be tapered, although this is not a requirement of the present invention. By "tapered" is meant that the threads are disposed on a taper (illustrated by axis 59 in FIG. 5).

FIG. 3 illustrates another embodiment of the present invention in which the pin 61 has a complex profile stab flank 63 for engaging a mating stab flank 65 of the box member 67. In this case, the stab flanks 63 of the pin are formed as multi-facited flanks having at least three facits 69, 71, 73 (FIG. 3) and four radii per stab flank. The facits are illustrated in angular fashion as the angles τ, π, and γ in FIG. 3. Note that the angles τ and π form obtuse angles with respect to the longitudinal axis 75 of the pipe connection while the angle γ forms an acute angle with respect to axis 75. The load flank 77 forms an obtuse angle μ with respect to axis 75 and slopes inwardly in the direction of the adjacent thread root 79, as viewed in FIG. 3.

Figure 4:
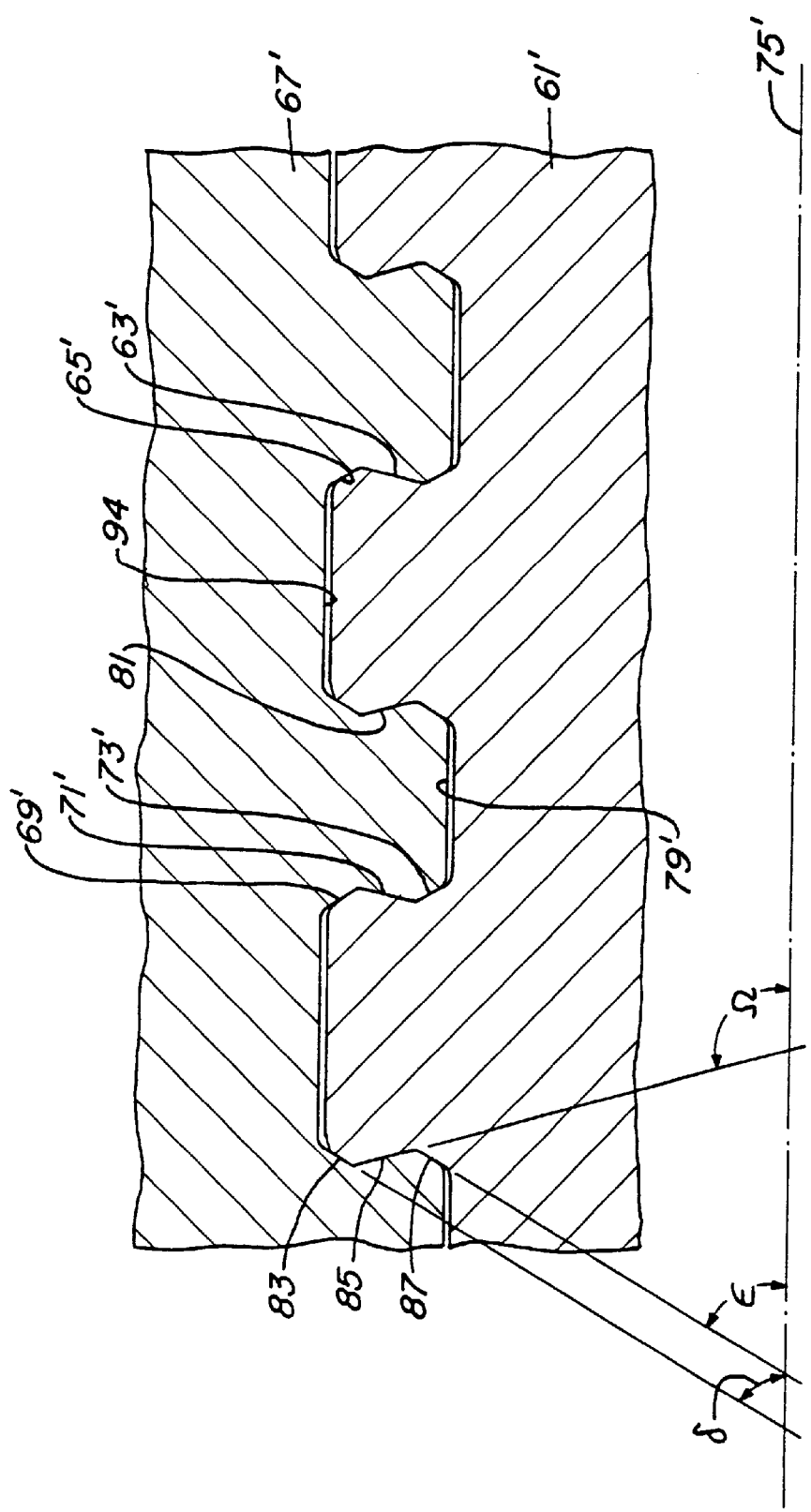
FIG. 4 is an isolated, close-up view of a thread form of the invention, similar to FIG. 3, wherein both the stab and load flanks of the pin member have the complex profile of the invention.

FIG. 4 illustrates another embodiment of the invention, similar to FIG. 3, in which the similar parts of the connection are designated with primes. In this case, however, the pin member 61' has a complex profile load flank 81, in addition to the complex profile stab flank 63 prime. In the embodiment of FIG. 4, the complex profile load flank 81 is also a multi-facited flank having at least three facits 83, 85, 87. The facits 83, 85, 87 are identical to, but oppositely arranged to facits 69', 71', 73' and form the angles, δ, ε and θ with respect to the longitudinal axis 75 prime of the connection.

Figure 6:
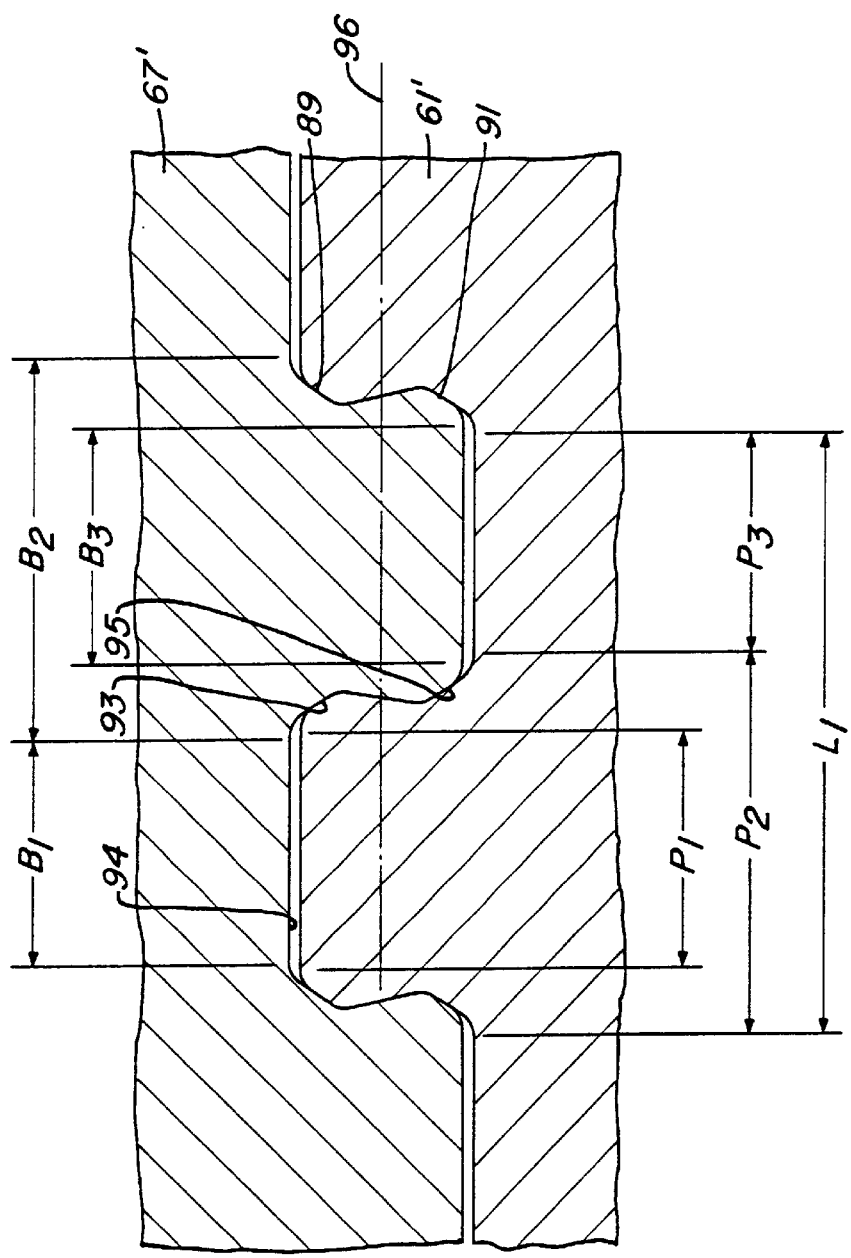
FIG. 6 is an isolated, close-up view of the preferred thread form of the invention, showing certain of the angular and dimensional aspects thereof.

With reference to FIG. 6, the facits 89, 91 form 30 degree positive facits for the load flanks of the end member 61' while the facits 93, 95 form 30 degree positive facits for the pin thread stab flanks of the pin member 61'. In FIG. 6, $B_1$ represents the box root groove width, $B_2$ represents the box root tooth width, $P_1$ represents the pin crest tooth width, $P_2$ represents the pin root tooth width, $B_3$ represents the box crest tooth width, $P_3$ represents the pin root groove width while $l_1$ represents the load flank lead. Note that the box crest is wider than the pin root and the pin crest is wider than the box root. Since the crest tooth width is smaller in width than the root tooth width, the thread teeth are oppositely dimensioned from conventional dovetailed threads. An offset clearance 94, e.g. on the order of 0.001 inch, is provided between the roots and crests upon make-up in order to vent entrapped lubricant. The roots and crests of the teeth may be parallel to the pipe axis or parallel or non-parallel to the pipe taper (96 in FIG. 6).

FIG. 2 is a close-up of a portion of the tool joint adapter connection of FIG. 1 showing a two step thread form utilizing the complex profile stab flank embodiment of the invention as illustrated in FIG. 3. Thus, the pin stab flanks 63 have the complex profile previously described. In the embodiment of FIG. 2, the thread structures 97 are formed on a larger radius while the second step threads 99 are formed on a smaller radius or distance from the longitudinal axis 101 of the connection. The two step thread can be either cylindrical or tapered and is generally recognized for speed of assembly during installation. Thread relief grooves 103, 105, 107 can be used for lubricant reserves if necessary or excluded all together. The metal-to-metal seal areas are shown in close-up fashion at 109, 111 in FIG. 2. The metal-to-metal seal at 109 is designed to be a short, low angle seal having an engaged length between about 0.200" and 0.400", preferably about 0.250" and between 1° and 5° taper. The purpose of the short seal is to allow the momentary extrusion of entrapped thread lubricant upon make-up of the connection without damage to the seal from radial yielding or collapse of the pin nose 112.

The metal-to-metal seal at 111 is designed to be a long, low angle seal having an engaged length of approximately triple that of the internal seal. Preferably, the long, low angle seal is of at least 0.400" in engaged length and between 1° and 5° taper. The purpose of the long seal is to provide the maximum mechanical support to the critical section illustrated as "c" in FIG. 2. It has been learned that in a connection of this configuration, a mechanical supporting seal as in 111 will greatly diminish fatigue stresses in the critical cross-section from rotation and bending of the connection.

It has been found in a connection of this configuration that the migration path of entrapped, excessive thread compound upon rotational make-up of the connection is from the outer region of the connection at 111 toward and through the inner region of the connection at 109. The clearance between roots and crests of the threads as shown at 94 on FIG. 6 facilitates this migration without structural damage to the connection from the pressure of entrapped thread lubricant.

During assembly utilizing either the single chevron or multi-faceted complex thread forms, the first contact is generally made with the stab flanks. The connection generally rides on the stab flanks initially until some interference on the chevrons occurs. This interference is generally a function of either built in design interference or, in the case of no design interference, caused by the ovality of the tubular members. The connection is generally free running until power engagement occurs. This action transfers the stab flank load to the load flanks. As soon as the transfer occurs, the load flank engagement acts as a positive stop. This movement will stop even though the box member crest and the pin member roots have not made contact. If additional torque is applied, the balance of forces on the contact surfaces of the thread flanks will stop further radial movement of the threads of the box member into the pin grooves and axial squeezing of the threads between the stab and load flanks will occur stopping further make-up. The amount of radial clearance (94 in FIG. 6) provided between the thread crests and roots is determined by the angles of the chevron or other complex profile flanks utilized. By properly determining the angles, the clearance space can be controlled without relying solely upon thread width as was the case in certain prior wedge thread designs.

An invention has been provided with several advantages. Axial make-up of the threaded connection of the invention can be controlled without abutting a shoulder on the joint by the wedging action of the threads themselves. Radial make-up can be controlled by the special thread structuring where the radial movement of the thread making up into a mating thread groove will be restricted by a complex profile on the stab flank, load flank, or combination thereof. By controlling the radial interfit between mating threads, lubricant entrapment can be controlled. The multi-faceted complex profiles of the load and stab flanks causes balanced stresses when the threads wedge upon make-up. By properly designing the angles of the multi-faceted flanks, it is possible to balance the radial stresses caused by the torque bearing loads with opposing stresses caused by the threads wedging between the stab and load flanks. There is thus created a balance of stresses such that radial forces cannot occur when the crests and roots of mating threads are in clearance.

The shoulderless connections of the invention eliminate concentration of stresses at points of shoulder contact. The shoulderless connection also eliminates the stiffening effect of the shoulders. This reduction is stiffness enables the pipe assembly to go through a tighter radius than would otherwise be the case. The wedge thread design of the invention presents a low profile connection which allows an opening up of the internal diameter of the pipe members. The threaded tool joint adapter of the invention seals off the threaded regions of the pin and box members with metal-to-metal seals to thereby seal internal and external pressures and insures that all stresses that would make the base material subject to corrosion attack will be encapsulated and isolated. Additionally, the metal-to-metal seals protect the internal critical section of the joint from corrosive fluids. This area of highest stress is protected, thereby eliminating this traditional point of failure.

While the invention has been shown in only three of its forms, it is not thus limited but is susceptible to various changes and modifications without departing from the spirit thereof.

What is claimed is:

1. A make and break threaded adapter connection capable of being screwed together and subsequently unscrewed, having encapsulated stresses, the adapter connection comprising:

a box having internal threads with stab flanks and load flanks and flat roots and crests and a pin having external threads with stab flanks and load flanks and flat crests and roots for mating with the internal threads of the box to make up a pipe connection, the threads increasing in width in one direction on the box and in the other direction on the pin so that the roots, crests and flanks form a wedge interfit upon make up of the connection;

a metal-to-metal mechanical bridge region formed between mating surfaces of the box and pin at opposite extents of the threaded surfaces thereof, the metal-to-metal mechanical bridge regions forming an internal and an oppositely arranged external support structure for the adjacent pin and box critical cross sections to maximize resistance to rotary or bending fatigue failure while in rotary or bending fatigue service, whereby the internal mechanical bridge region serves to seal off the escape of internal pressure through the connection and incidental transmission of corrosive fluids to the pin or box critical cross sections and whereby the external mechanical bridge region serves to seal off incidental leaching of corrosive fluids to the pin critical cross section, said mechanical bridge regions serving to isolate the encapsulated surfaces from corrosive attack and subsequent stress corrosion cracking;

wherein the external mechanical bridge region exceeds the internal mechanical bridge region in engaged length by a ratio of greater than 2:1; and wherein the combination of metal-to-metal mechanical bridge regions and wedge interfit of the pin and box threads forms an interlocked connection which resists radial separation without requiring diametrical interference.

2. A make and break threaded pipe connection capable of being screwed together and subsequently unscrewed, having encapsulated stresses, the threaded pipe connection comprising:

a box having internal threads with stab flanks and load flanks and flat roots and crests and a pin having external threads with stab flanks and load flanks and flat crests and roots for mating with the internal threads of the box to make up a pipe connection, the threads increasing in width in one direction on the box and in the other direction on the pin so that the roots, crests and flanks form a wedge interfit upon make up of the connection;

a metal-to-metal mechanical bridge region formed between mating surfaces of the box and pin at opposite extents of the threaded surfaces thereof, the metal-to-metal mechanical bridge regions forming an internal and an oppositely arranged external support structure for the adjacent pin and box critical cross sections to maximize resistance to rotary or bending fatigue failure while in rotary or bending fatigue service, whereby the internal mechanical bridge region serves to seal off the escape of internal pressure through the connection and incidental transmission of corrosive fluids to the pin or box critical cross sections and whereby the external mechanical bridge region serves to seal off incidental leaching of corrosive fluids to the pin critical cross section, said mechanical bridge regions serving to isolate the encapsulated surfaces from corrosive attack and subsequent stress corrosion cracking;

wherein the external mechanical bridge region exceeds the internal mechanical bridge region in engaged length by a ratio of greater than 2:1 and wherein the combination of metal-to-metal mechanical bridge regions and wedge interfit of the pin and box threads forms an interlocked connection which resists radial separation without requiring diametrical interference.

* * * * *

UNITED STATES PATENT AND TRADEMARK OFFICE
CERTIFICATE OF CORRECTION

PATENT NO. : 6,722,706 B2
DATED : April 20, 2004
INVENTOR(S) : Kris L. Church

It is certified that error appears in the above-identified patent and that said Letters Patent is hereby corrected as shown below:

Title page,
Item [54], Title, should read: -- THREAD FORM WITH MULTIFACITED FLANKS --

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

P BATENT NO. : 6,722,706 B2
DATED : April 20, 2004
INVENTOR(S) : Kris L. Church

It is certified that error appears in the above-identified patent and that said Letters Patent is hereby corrected as shown below:

<u>Title page,</u>
Item [73], Assignee, should read -- TorqueLock Corporation, Conroe, Texas --

Signed and Sealed this

Fifth Day of October, 2004

JON W. DUDAS
*Director of the United States Patent and Trademark Office*